Sept. 4, 1951  R. M. BRISTOL  2,566,691
RESILIENT SPRING DEVICE
Filed March 9, 1946  2 Sheets-Sheet 1

INVENTOR
Raymond M. Bristol
BY
Howard Brennan
his ATTORNEY

Sept. 4, 1951 R. M. BRISTOL 2,566,691
RESILIENT SPRING DEVICE
Filed March 9, 1946 2 Sheets-Sheet 2
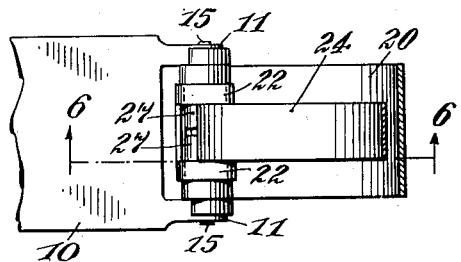
Fig.5.
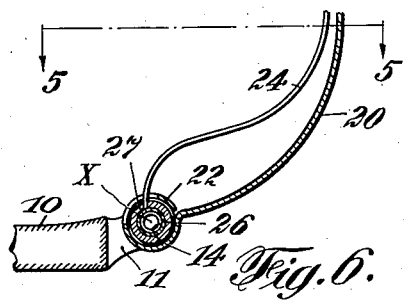
Fig.6.
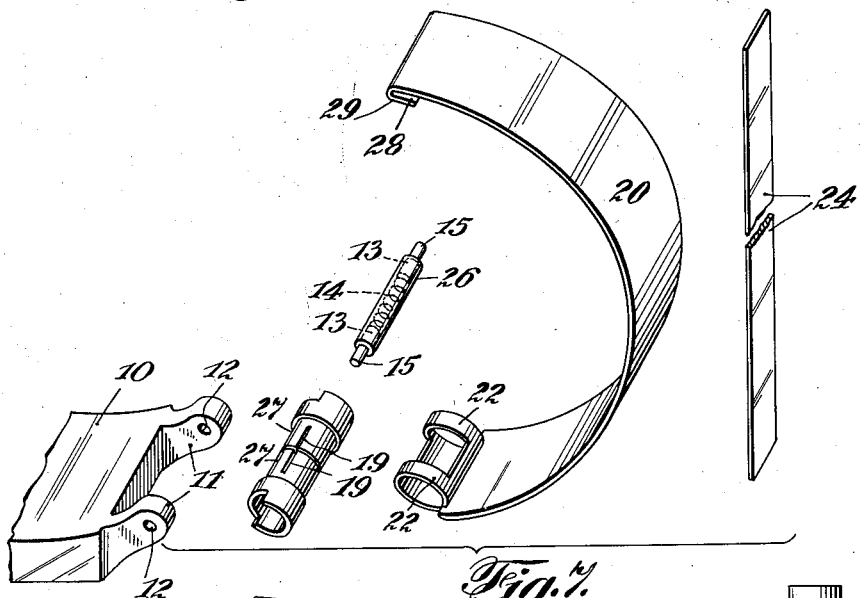
Fig.7.
Fig.10.
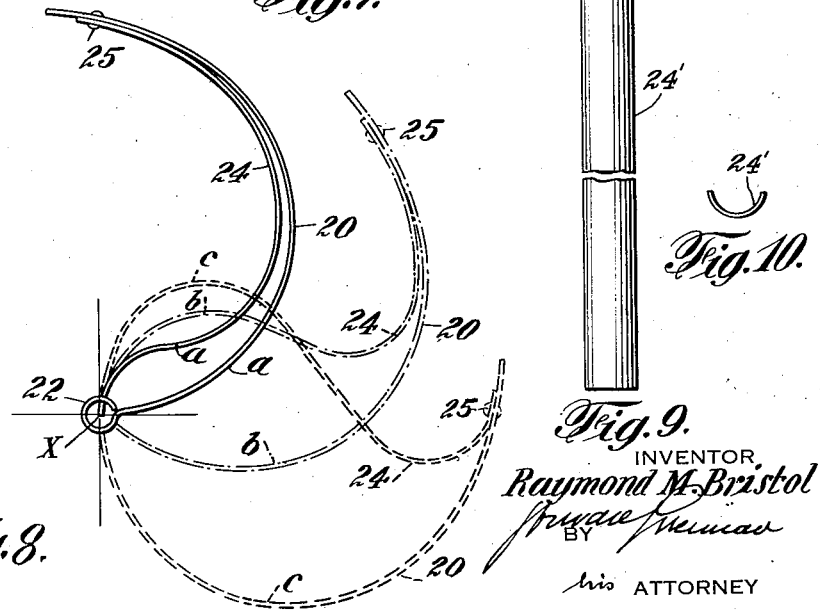
Fig.9.
Fig.8.
INVENTOR,
Raymond M. Bristol
BY
his ATTORNEY Patented Sept. 4, 1951

2,566,691

UNITED STATES PATENT OFFICE 2,566,691

RESILIENT SPRING DEVICE

Raymond M. Bristol, New York, N. Y., assignor to
Alexander Shemet, New York, N. Y.

Application March 9, 1946, Serial No. 653,331

6 Claims. (Cl. 267—1)

1

My invention refers to resilient devices and refers particularly to resilient devices adapted to automatically retain two pivotally attached members in two predetermined positions.

One of the objects of my invention is resilient means co-acting with two hingedly attached members to automatically and removably retain the two members in different positions with respect to each other.

Another object of my invention is means co-acting with two hingedly attached members to automatically and removably retain the movable member in different positions with respect to the stationary member.

Another object of my invention is resilient means fixedly attached to a member and non-revolubly attached to another member and adapted to automatically and removably retain the two members in different positions with respect to each other.

Another object of my invention will be evident from a consideration of the devices of my invention as described and illustrated in this specification and its accompanying drawings.

The devices of my invention may be described, in a general way, as comprising a resilient element or elements, preferably flat resilient element or elements, fixedly attached to one member and non-revolvably attached to another member, these two members being hinged, or otherwise revolvably attached to each other.

The resilient element is of such construction and is so positioned with respect to the two members to which it is attached, that during the movement of these two members with respect to each other, the direction of the moving force or resilient pressure will be reversed in each member, thus tending to move the members in opposite directions with respect to each other, as the members are being separated, and as the resilient member acts, also, to limit such movements, the arc of the revolvable movement will be of a predetermined length.

Assume that the device of my invention is applied for the opening and closing of a door, the opening arc of the door to be limited to 90° with respect to the door frame to which the door is hingedly attached. The resilient element of my device is so arranged that when the door is closed the resilient pressure will be toward the closed position of the door and will remain in that condition until the door has been opened to approximately 45°, whereupon the resilient pressure will automatically change to a resilient pressure away from the closed position of the door to one

2 tending to open the door, and will thus continue until the door is opened to 90°, whereupon the resilient element will operate to maintain the door in that open position.

It is evident, therefore, that in order to operate a door under the above described conditions, it is necessary to open the door manually only until it has reached the 45° arc, whereupon the door may be released from its manually obtained position and the resilient element will operate to open the door to the 90° position and will retain it in that position.

Upon closing the door the above described operation will be reversed, and when the door has been manually moved to the 45° arc, the resilient element will automatically finish the closed position and retain the door in that position.

It is evident that the resilient element may be so constructed and so positioned that the above-mentioned operation will be performed through different arcs of movement of the two hinged devices.

I have thus described my invention as applied to the opening and closing of a door simply as a means of describing its operation, and it is evident that it is adaptable for use with any other hingedly attached devices, and hence my invention is not limited to the particular devices described.

In my specification and in the accompanying drawings, I have described my device as applied to a bracelet, or wrist watch, as another example of the breadth of my invention.

In the accompanying drawings I show modified forms of my device as applied to a bracelet, or wrist watch, similar parts being indicated by similar numerals.

Figure 5 is a section through the line 5—5 of Figure 6, showing a modified form of attachment of the two hinged members of my invention.

Figure 6 is a section through the line 6—6 of Figure 5.

Figure 7 is an exploded perspective view of the elements of the device of Figures 5 and 6.

Figure 8 is a side view of the resilient member of the two illustrated devices, showing its various positions during the movements of the two hinged members with relation to each other.

Figure 9 is a plan view of a modified form of spring.

Figure 10 is an end view of the spring of Figure 9.

Figure 1:
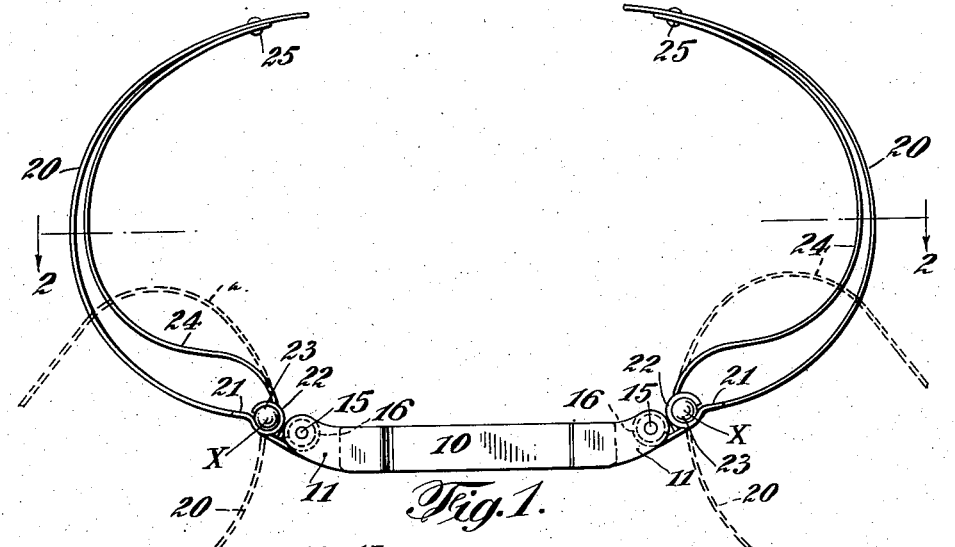
Figure 1 is a side view of one form of a device of my invention.
Figure 2:
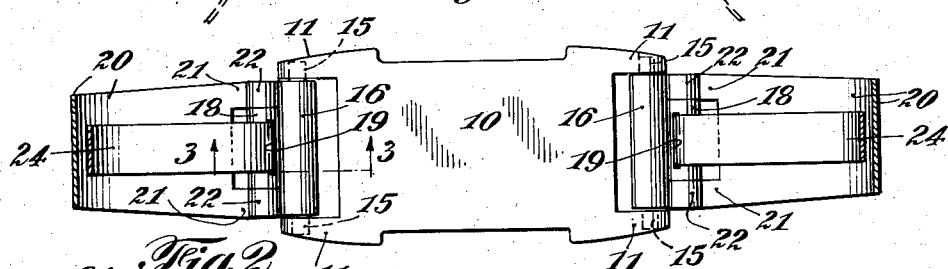
Figure 2 is a section through the line 2—2 of Figure 1.
Figure 3:
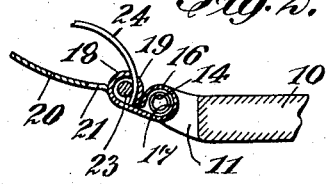
Figure 3 is a section through the line 3—3 of Figure 2.
Figure 4:
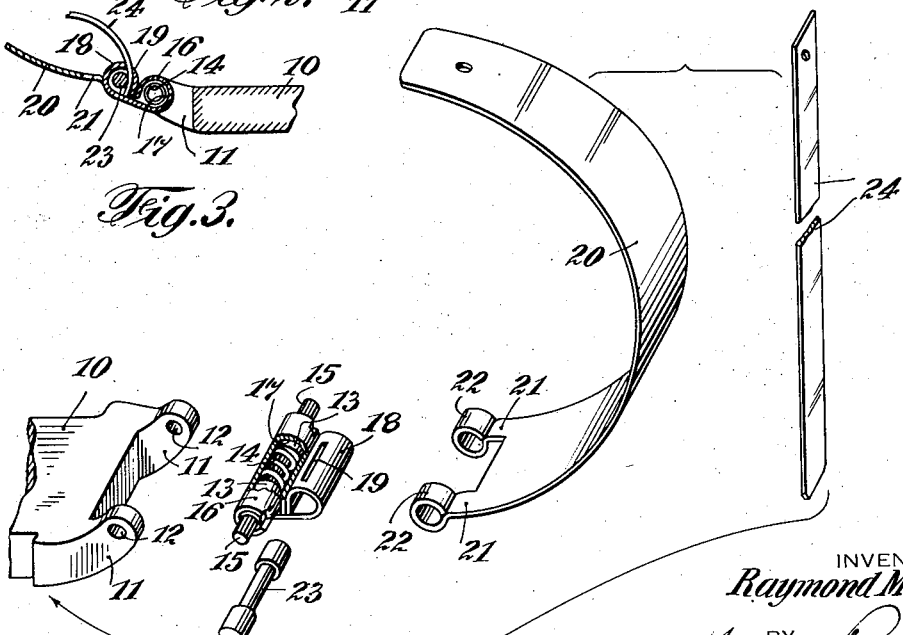
Figure 4 is an exploded perspective view of the elements of Figure 1.

The particular form of a device of my invention illustrated in Figures 1 to 4, inclusive comprises a stationary base member 10, to which a watch or other article may be attached, each end of said base member 10 having two spaced arms, 11, 11 each pair of said arms 11, 11 having aligned openings 12, 12.

Passing through pair of openings 12, 12 there is a hinge pintle, said pintle comprising two members 13, 13 spaced from each other and a coil spring 14. The outer end portion 15 of each member 13 is knurled and tapered for purposes described later.

The hinge casing, or pintle-retaining member, comprises a metal blank turned to form the casing 16, having an opening 17 therein and the casing 18 having the slot opening 19 therein.

To insert the pintle into the opening 12, 12 of the arms 11, 11 the two ends 15, 15 are pressed inwardly, the pintle thus formed is passed through the opening 17 of the casing 16, and the pressure upon the ends released thus allow the ends 15, 15 to be passed through the openings 12, 12 of the arms 11, 11 by the resiliency of the spring 14. The knurled ends 15, 15 will prevent a revolvable movement of the pintle within its casing 16. A movable member 20 has two spaced arms 21, 21, the extended ends of which are turned to form the two bearings 22, 22.

The movable members 20, 20 are attached to the casing 18 by means of the pintle 23, passed through the casing 18 and the openings in the bearings 22, 22, the outer ends of the pintle 23 being enlarged to prevent its accidental removal.

A flat spring 24 placed upon the inner face of the member 20 is fixedly attached to the casing 18 by passing the inner end portion of the spring 24 through the opening 19 of the casing 18, and the outer end portion of the spring 24 is attached to the member 20 by means of a rivet 25.

It will thus be seen that one end portion of the spring 24 is fixedly attached to the outer end portion of the member 20 while the other end portion of the spring 24 is fixedly attached to the non-revolvable casing 18. It is evident that the end of the spring attached to the member 20 will follow the arc of the member 20 when it is revolved around the pintle 23, while the other end of the spring 24 will not revolve around the pintle 23.

A reference to Figure 8 will indicate the operation of my device when moved from a closed position to an open one.

It is to be noted particularly that the spring 24 is not preformed, that is, the spring 24 is in a flat plane when it is not embodied in the device and hence without resilient force in any direction, it is in arced position when attached to the arced member 20 and casing 18 and hence under constant tension. It will be noted, also, that while the member 20 revolves around the point X, the spring 24 does not revolve around that point. The flat spring 24 is, therefore, tensioned at all times.

When the member 20 and the spring 24 are in the position $a$, $a$ of Figure 8, the spring 24 has a tension tendency to resist movement of the member 20 toward the right. If these members be manually moved toward the right to the position $b$, $b$, the spring 24 is in balanced condition, and will not have a tendency to move the member 20 in either direction, if this is approximately a 45° movement. If, however, the spring 24 be moved slightly toward the right, it will have a resilient tendency to move the member 20 to the position $c$, $c$. The movement in a reverse direction will have a reverse action from that described.

The length of this revolvable movement can be governed by the position of fixed attachment of the spring 24 to the member 20, as well as by varying the curvature of the device 20.

The modified form of my device illustrated in Figures 5, 6 and 7 is similar in construction to the form of device illustrated in the former figures, except that the pintle 26 is supported by the arms 11, 11 of the base member 10 and carries the non-revolvable casing 27, 27 around which the member 20 is revolvable; and the spring 24 is maintained against the face of the member 20 by one end of said spring being positioned within the recess 28 formed by the turned edges 29 of the member 20, instead of being riveted thereto.

It is to be noted that the radius of the arc described by the resilient member 24 during the movement of the two hinged members 10 and 20 with respect to each other is less than the radius which would be described by the resilient member 24 were it held at one end while in its normal non-tensioned condition, that is, when the member 24 is not embodied in the device, and the free end of the member 24 displaced by a force.

In Figs. 9 and 10 is shown another embodiment of a spring, viz., an arcuate resilient member 24', which may be employed in place of the flat spring 24 in either of the devices described hereinbefore. The resilient member 24' may be readily disposed in the device shown in Figs. 5, 6 and 7 by forcing the ends thereof respectively into the slot 19 and recess 28. The resilient member 24' may also be readily assembled to the device shown in Fig. 1 by forcing the one end into the slot 19 and providing an opening at the other end and riveting said latter end to the arcuate member 20.

I do not limit myself to the specific size, shape, number or arrangement of parts described and shown, as these were given solely for the purpose of clearly describing the devices of my invention, and it is evident that they may be varied without going beyond the scope of my invention.

What I claim is:

1. A resiliently movable device comprising two hingedly attached members at least one of which is concave-faced with respect to the other said member, a hinge interconnecting said two members, a resilient member one end portion of which is substantially concentric with and immovably carried by the unconnected portion of said concave-faced member and the other end portion of said resilient member being connected to and maintained from revolution relative to the other said member during the revolution of the said two members around said hinge.

2. A resiliently movable device comprising two hingedly attached members at least one of which is concave-faced with respect to the other said member, a hinge interconnecting said two members, a resilient member one end portion of which is substantially concentric with and fixedly attached to the unconnected portion of said concave-faced member and the other end portion of said resilient member being connected to and maintained from revolution relative to the other said member during the revolution of the said two members around said hinge.

3. A resiliently movable device comprising two hingedly attached members at least one of which is concave-faced with respect to the other said member, a hinge interconnecting said two members, a resilient member one end of which is substantially concentric with and immovably carried by the unconnected portion of said concave-faced member, the other end portion of said resilient member being connected to and maintained from revolution relative to the other said member during the revolution of the concave-faced member around said hinge and being adapted to resiliently move said concave-faced member with respect to said other member in one direction during a portion of its revolution and to resiliently move said concave-faced member in a reverse direction during the completion of the revolvable movement of said concave-faced member.

4. A resiliently movable device comprising a base member, a concave-faced member hingedly attached to each of opposite sides of said base member, a hinge interconnecting each said concave-faced member to said base member, a resilient member for each of said concave faced members, one end portion of each of said resilient members being substantially concentric with and immovably carried by the unconnected portion of each of said concave faced members, the other end of each of said resilient members being connected to and maintained from revolution relative to the other said member during the revolution of said concave-faced members around said hinges, said resilient members being adapted to resiliently move each concave-faced member in the direction of said base member during a portion of the revolution of said concave-faced member and to resiliently move said concave-faced member away from said base member during the completion of the revolvable movement of said concave-faced member.

5. A resiliently movable device comprising a base member, a concave-faced member hingedly attached to each of opposite sides of said base member, a hinge interconnecting each said concave-faced member to said base member; a resilient member for each said concave-faced member one end portion of each of which is substantially concentric with and immovably carried by the unconnected portion of said concave-faced member and the other end portion of said resilient member being connected to and maintained from revolution relative to the other said member during the revolution of the said concave-faced member around the hinge, said resilient member being of such initial construction that it will normally lie in a flat plane before being assembled to the device.

6. A resiliently movable device comprising two hingedly attached members at least one of which is concave-faced with respect to the other said member, a hinge interconnecting said two members, a resilient member one end portion of which is substantially concentric with and immovably carried by the unconnected portion of said concave-faced member and the other end portion of said resilient member being connected to and maintained from revolution relative to the other said member during the revolution of either of the said two members around said hinge.

RAYMOND M. BRISTOL.

REFERENCES CITED

The following references are of record in the file of this patent:

UNITED STATES PATENTS

| Number | Name | Date |
| --- | --- | --- |
| 252,444 | Engel | Jan. 17, 1882 |
| 637,852 | Chandler | Nov. 28, 1899 |
| 725,322 | Davis | Apr. 14, 1903 |
| 824,318 | Thorp | June 26, 1906 |
| 897,983 | Kerby | Sept. 8, 1908 |
| 2,024,362 | Hoopes | Dec. 17, 1935 |

FOREIGN PATENTS

| Number | Country | Date |
| --- | --- | --- |
| 411,944 | Great Britain | June 21, 1934 |
| 521,557 | Great Britain | May 24, 1940 |